(12) United States Patent
Scott

(10) Patent No.: US 7,668,678 B2
(45) Date of Patent: Feb. 23, 2010

(54) CALIBRATION OF A METROLOGICAL APPARATUS

(75) Inventor: Paul James Scott, Leicester (GB)

(73) Assignee: Taylor Hobson Limited, Leicester (GB)

( * ) Notice: Subject to any disclaimer, the term of this patent is extended or adjusted under 35 U.S.C. 154(b) by 0 days.

(21) Appl. No.: 12/063,963

(22) PCT Filed: Aug. 16, 2006

(86) PCT No.: PCT/GB2006/003067

§ 371 (c)(1),
(2), (4) Date: Feb. 15, 2008

(87) PCT Pub. No.: WO2007/020441

PCT Pub. Date: Feb. 22, 2007

(65) Prior Publication Data

US 2008/0234963 A1     Sep. 25, 2008

(30) Foreign Application Priority Data

Aug. 18, 2005   (GB) ................................. 0516990.9

(51) Int. Cl.
*G01C 17/38* (2006.01)
(52) U.S. Cl. .......................................... 702/95; 702/94
(58) Field of Classification Search ................... 702/95
See application file for complete search history.

(56) References Cited

U.S. PATENT DOCUMENTS

| | | |
|---|---|---|
| 3,452,273 A | 6/1969 | Foster |
| 3,509,135 A | 4/1970 | Brown |
| 5,150,314 A | 9/1992 | Garratt et al. |
| 5,189,806 A | 3/1993 | McMurtry et al. |
| 5,517,307 A | 5/1996 | Buehring et al. |

(Continued)

FOREIGN PATENT DOCUMENTS

DE            44 39 578            2/1996

(Continued)

OTHER PUBLICATIONS

GB Search Report for GB 05166990.9; Dated: Oct. 26, 2005.

(Continued)

*Primary Examiner*—Bryan Bui
*Assistant Examiner*—Jonathan Teixeira Moffat
(74) *Attorney, Agent, or Firm*—RatnerPrestia

(57) ABSTRACT

A metrological apparatus has a driver (33) that effects relative movement between a support (4) and a measurement probe (8) carriage (7) in a first direction (X) to cause the measurement probe (8) to traverse a measurement path along a surface of an object supported by the support. The measurement probe (8) moves in a second direction (Z) transverse to the first direction as it follows surface characteristics. Respective first and second position transducers (35, 32) provide first and second position data representing the position of the measurement probe in the first and second direction. A calibrator (300) carries out a calibration procedure using measurement data obtained on a surface of known form. The calibrator determines calibration coefficients of an expression relating corrected measurement data and the actual measurement data by using the known form of the reference surface as the corrected measurement data. The calibrator varies the calibration coefficient for Chebychev points until the at least one expression provides a fit to the data.

25 Claims, 9 Drawing Sheets

U.S. PATENT DOCUMENTS

| | | | |
|---|---|---|---|
| 6,643,944 B2 * | 11/2003 | Yoda et al. | 33/558 |
| 7,254,506 B2 * | 8/2007 | McMurtry et al. | 702/95 |
| 2004/0244464 A1 * | 12/2004 | Hajdukiewicz et al. | 73/1.79 |
| 2005/0132591 A1 | 6/2005 | Kojima et al. | |

FOREIGN PATENT DOCUMENTS

| | | |
|---|---|---|
| EP | 0 036 251 | 9/1981 |
| EP | 0 240 151 | 7/1987 |
| EP | 0 404 597 | 12/1990 |
| GB | 2 233 459 | 1/1991 |
| GB | 2 378 254 | 2/2003 |
| WO | WO 03/038375 | 5/2003 |

OTHER PUBLICATIONS

PCT International Search Reported for PCT/GB/2006/003067; Completed Oct. 23, 2006; Mailed Nov. 11, 2006.

*Barycentric Lagrange Interpolation*; Jean-Paul Berrut et al.; 2004 SIAM Review; vol. 46, No. 3, pp. 501-517.

* cited by examiner

CALIBRATION OF A METROLOGICAL APPARATUS

This Application is a U.S. National Phase Application of PCT/GB/2006/003067, filed Aug. 16, 2006, which claims priority of GB 0516990.9 filed Aug. 18, 2005.

This invention relates to a metrological apparatus, in particular a metrological apparatus capable of measuring surface characteristics such as form, that is the overall shape of a surface, and texture or roughness of a surface.

Such metrological apparatus includes a measurement probe, for example a stylus, which traverses the surface of the workpiece and a position transducer which produces a signal dependent upon the movement of the measurement probe in response to the surface characteristics. Measurement of surface texture or roughness requires high resolution while measurement of form requires movement of the measurement probe over a relatively large distance.

The range over which the position transducer provides an output with good linearity may be smaller than the required measurement range of the metrological apparatus. For a variety of reasons, the linearity of the output will vary depending on the precise nature of the transducer used. For example, where the measurement probe is a pivotably mounted stylus then the movement of the stylus will be along an arcuate path and not precisely perpendicular to the plane of the surface being measured. In the case of a stylus type measurement probe, further inaccuracies may arise from the finite size of the stylus tip. Also the transducer may have a non-linear response. For example, where the transducer comprises a Linear Variable Differential Transducer (LVDT), then non-linear changes in the coupling between the core and the coils of the LVDT may occur, particularly at the end of the measurement range.

The above factors mean that calibration of the metrological apparatus is required.

U.S. Pat. No. 5,150,314 describes a method of calibrating a metrological apparatus by traversing a measurement probe in a first direction (in an embodiment the X direction) along a measurement path on a reference object surface of known form, usually a sphere, so that the measurement probe follows surface variations in a second direction (in an embodiment the Z direction) transverse to the first direction to obtain measurement data comprising first and second position data representing the position of the measurement probe in the first and second directions, respectively, at each of a plurality of measurement points along the measurement path and then fitting the measurement data to the known form of the sphere using respective polynomial expansions for the first and second position data using a least squares fitting procedure to obtain calibration corrections or coefficients for calibrating the transducer measurement range.

In one aspect, the present invention provides a metrological apparatus having control means operable to carry out a calibration procedure to enable correction of measurement data, the control means being operable: to receive calibration measurement data comprising measurements made at measurement points along a calibration measurement path over a reference surface of known form by effecting relative movement between the reference surface and a measurement probe; and to determine calibration coefficients of at least one expression representing the relationship between corrected measurement data represented by the known form of the reference surface and the calibration measurement data by varying the calibration coefficients for a number of calibration points spaced within the calibration measurement data and fewer in number than the measurement points until the at least one expression provides a fit to the data, thereby enabling corrected measurement data to be obtained using the determined calibration coefficients in the at least one expression.

The determined calibration coefficients made be stored so that subsequent measurement data may be corrected by applying the at least one expression using the determined calibration coefficients. As another possibility, corrected measurement data for the range of the transducer may be determined during the calibration procedure and a look-up table associating measurement data values with the corresponding correction data values may be stored by the control means so that, when a subsequent measurement operation is carried out, the resulting measurement data made be corrected by looking up the corresponding corrected measurement data in the look-up table.

Fitting the at least one expression by adjusting or varying calibration coefficients for spaced calibration points within the measurement data is more stable than the use of a polynomial expansion algorithm with the same number of calibration coefficients. The spaced calibration points may be selected so as to avoid the phenomenon (known as the Runge phenomenon) that errors increase exponentially, particularly at the ends of the calibration range, as the number of data points to be fitted increases. This enables calibration over larger measurement ranges.

In an embodiment, the fitting procedure comprises a Barycentric fitting procedure, for example as described in the paper entitled "Barycentric Lagrange Interpolation" by Jean-Paul Berrut and Lloyd N. Trefethen published in the Society for Industrial and Applied Mathematics (SIAM) Review Volume 46 No. III at pages 501 to 517 in 2004.

In an embodiment, the specifically spaced points are Chebychev points; in an example Chebychev points of the second kind discussed on page 506 of the abovementioned paper, although any of the four kinds of Chebychev points discussed in the aforementioned paper may be used.

In an embodiment, the fitting procedure uses the Barycentric Lagrange polynomial expressions:

$$Z_{cm} = \frac{\sum_{j=0}^{N} \frac{w_j}{Z_m - Z_j} BZ_j}{\sum_{j=0}^{N} \frac{w_j}{Z_m - Z_j}}$$

$$X_{cm} = X_m + \frac{\sum_{j=0}^{N} \frac{w_j}{Z_m - Z_j} BX_j}{\sum_{j=0}^{N} \frac{w_j}{Z_m - Z_j}}$$

where X and Z are the first and second directions, respectively, $Z_{cm}$ is the corrected calibrated Z data for the mth measured point where m is 1, 2, . . . M where M is the total number of measurement points, $Z_m$ is the Z coordinate of the mth measured point, $BZ_j$ is the calibration coefficient for the Z coordinate of the jth Chebychev point, $Z_j$ is the Z coordinate of the jth Chebychev point, $X_{cm}$ is the corrected calibrated X data for the mth measured point, $X_m$ is the X coordinate of the mth measured point, $BX_j$ is the calibration coefficient for the X coordinate of the jth Chebychev point, $w_j$ is the Barycentric weight for the jth Chebychev point and N+1 is the number of Chebychev points.

In an embodiment, the calibration coefficients for one of the Chebychev points are fixed. Generally, for ease of calculation, there is an odd number of Chebychev points and the calibration coefficients for the middle Chebychev point are, for ease of calculation, set to zero. Although the use of an odd number of calibration points facilitates calculation, an even number of Chebychev points may be used, in which case the fixed Chebychev point will generally be one of two Chebychev points on either side of the middle measurement point within the measurement data.

In an embodiment, the number N+1 of Chebychev points is five, although there may be more Chebychev points, depending upon the extent of the measurement range to be calibrated.

In an embodiment, the Chebychev points are Chebychev points of the second kind and the Z coordinates of these points are given by:

$$Z_j = ZT \cdot \cos(n\pi/N)$$

where n is 0, 1, ... N and ZT is the full measurement range of the measurement probe, and the weights $w_j$ are given by:

$$w_j = (-1)^j \delta_j$$

where $\delta_j$ is ½ for j=0 or N and is otherwise 1. It will be appreciated that, where the calibration coefficients for a calibration point are set to zero (for example for a middle fixed point), another option would be to set the weight for that point to zero rather than the calibration coefficient.

In an embodiment where the calibration measurement path is an arc of a circle, for example where the reference object of known form is a sphere, the fitting procedure minimises:

$$\sum_{i=1}^{M} \left\{ \sqrt{(X_{ci} - A)^2 + (Z_{ci} - B)^2} - R \right\}^2$$

by determining when a tolerance t (representing a distance squared) reaches a predetermined value, where $$t_i = R^2 - (X_{ci} - A)^2 - (Z_{ci} - B)^2$$

where $X_{ci}$ and $Z_{ci}$ are the current values of the corrected coordinate data for the ith measurement point, M is the total number of measurement points as above and A and B are the current values for the centre of the circle, that is the centre of known form where the reference surface is a sphere.

In an embodiment, the least squares fitting procedure is a non-linear least squares fitting procedure such as a Gauss-Newton fitting procedure. Given's least squares routine may be used.

Embodiments of the present invention will now be described, by way of example, with reference to the accompanying drawings, in which:

FIG. 1 shows a schematic perspective view of a metrological apparatus 1 for measuring surface characteristics, in particular at least one of surface form and texture or roughness.

Figure 1:
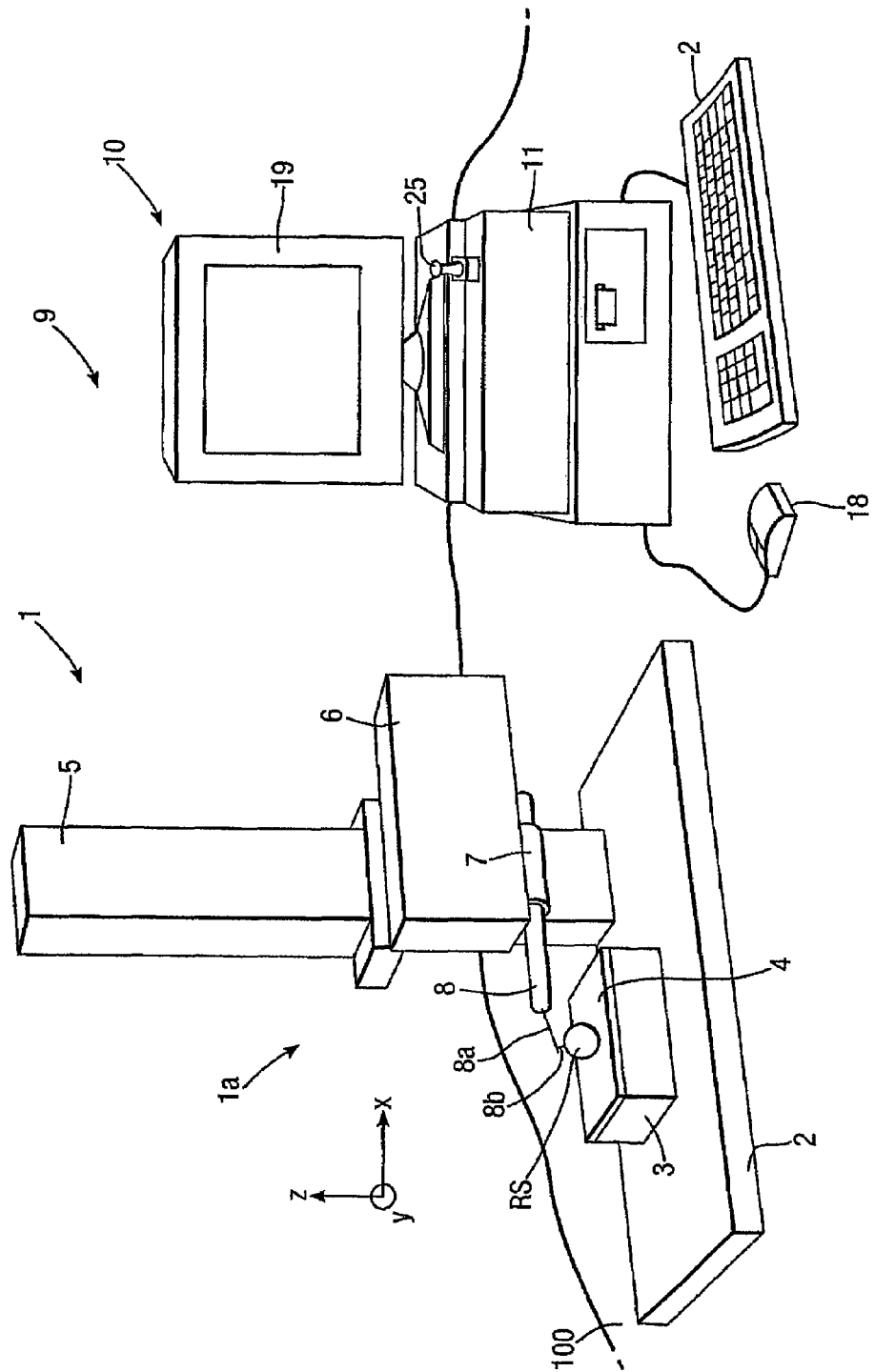
FIG. 1 shows a schematic perspective view of an example of a metrological apparatus embodying the present invention.

The metrological apparatus may be based on a Form Talysurf Series of metrological apparatus supplied by Taylor Hobson Limited, of Leicester, England, United Kingdom.

In this embodiment, the metrological apparatus 1 has a base 2 designed to be placed on the workbench or desk 100. A workpiece support 3 is mounted to the base 2 and carries a workpiece support platform 4. The workpiece support platform 4 may be fixed or may be movable relative to the support 3 in the Y direction (that is into the plane of the paper in FIG. 1) by means of a motorised ballscrew arrangement (not shown in FIG. 1).

The base 2 also carries a column 5 which defines a vertical or Z axis reference datum. A column carriage 6 is mounted to the column 5 so as to be movable in the Z direction (that is up and down the column). In this embodiment, movement of the column carriage 6 in the Z direction is effected by a motorised leadscrew drive arrangement (not shown in FIG. 1), although any suitable form of drive mechanism may be used and in an example the column carriage may be manually movable.

The column carriage 6 carries a measurement probe carriage 7 which is movable relative to the column carriage 6 in the X direction in FIG. 1. In this embodiment, the measurement probe carriage 7 is mounted so as to be slidable along an X axis datum bar mounted within the column carriage 6 and is pushed or pulled along the X axis datum bar in the X direction by means of a motorised pulley drive arrangement (not visible in FIG. 1) or any other suitable form of drive mechanism.

The measurement probe carriage 7 carries a measurement probe 8 comprising a stylus comprising a stylus arm 8a pivotable about a pivot point 8d (not visible in FIG. 1, see FIG. 4 or 5) and carrying at its free end a stylus tip 8b which is arranged to come into contact with the surface to be measured so that, as the measurement probe 8 is traversed in the X direction across the surface to be measured, the stylus arm 8a pivots to enable the stylus tip 8b to follow variations of the surface in the Z direction.

The components of the metrological apparatus mounted on the base 2 form a measurement system 1a of the metrological apparatus 1. The metrological apparatus 1 also has a data acquisition, processing and control system (DAPCS) 9 which controls a measurement operation by the measurement system 1a and also processes data received from the measurement system 1a. The DAPCS 9 consists of computing apparatus 10 (in the form of a personal computer, workstation or the like) which interfaces with the measurement system 1a via a master controller 11 as will be explained in greater detail below with reference to FIG. 2.

Figure 2:
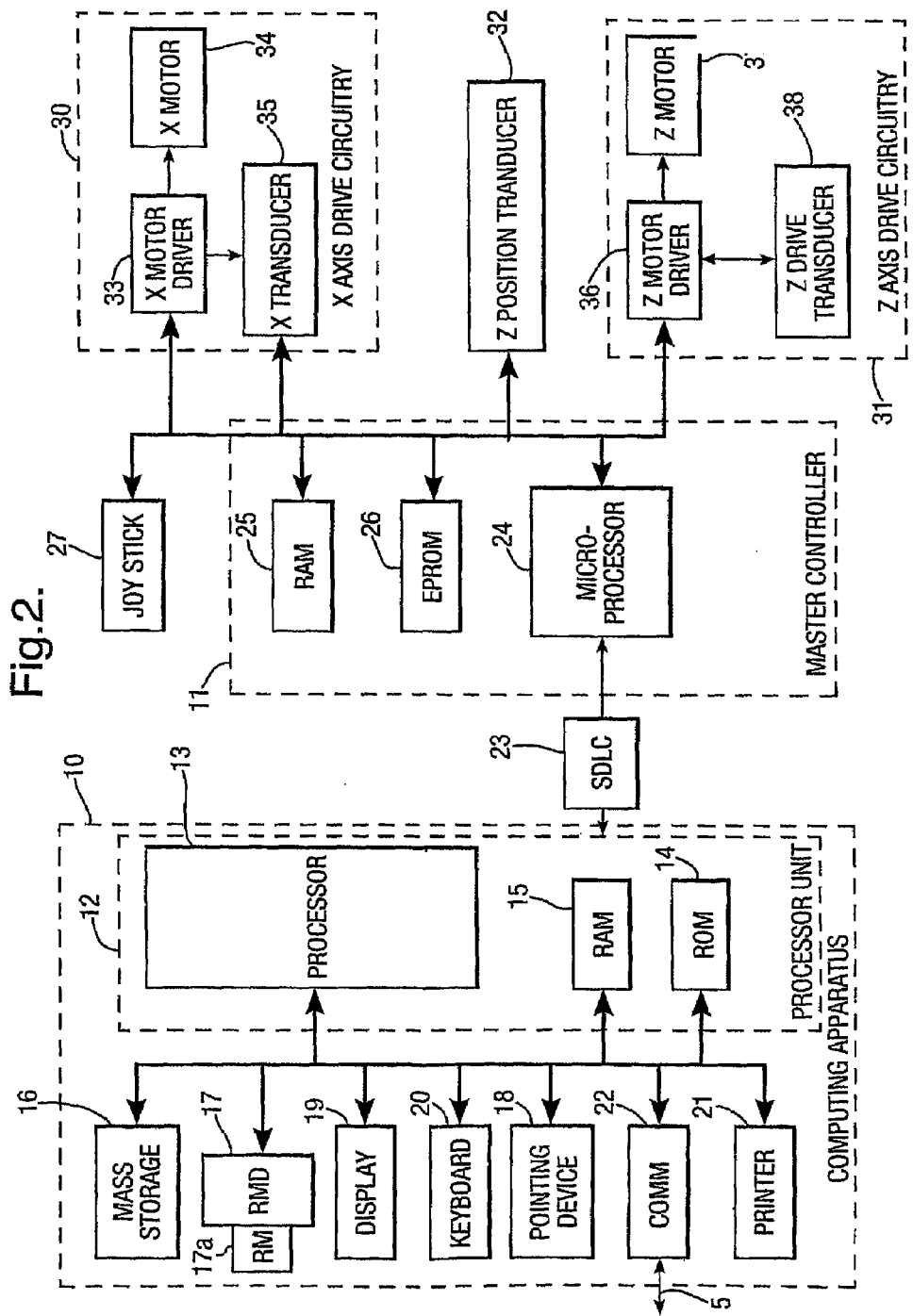
FIG. 2 shows a functional block diagram of the metrological apparatus shown in FIG. 1.

As shown in FIG. 2, the computing apparatus 10 comprises a processor unit 12 (which consists essentially of a processor or processors 13 and associated memory such as ROM 14 and RAM 15), a mass storage device such as a hard disk drive 16, a removable medium drive (RMD) 17 for receiving a removable medium (RM) 17a such as a floppy disk, CD-ROM, DVD or the like, a pointing device 18 such as a mouse as shown in FIG. 1 or a digitizing tablet, and a display 19 for displaying information to the user.

The computing apparatus 10 may also have a keyboard 20 for enabling keyed entry of data and/or control instructions and the like and a printer 21 for enabling print out of information.

The computing apparatus 10 may also have a communications device (COMM) 22 for enabling connection to, for example, other computing apparatus, either directly or via a network such as the Internet, an intranet, a WAN (Wide Area Network) or a LAN (Local Area Network) connection. The communications device 22 may provide a wired or wireless link (for example an infra red or radio frequency link) and where the connection is via a network may comprise a MODEM and/or network card, as appropriate.

The computing apparatus 10 is provided generally for user input and to process and display measurement results. The computing apparatus 10 is coupled via an appropriate interface 23, (generally an SDLC (Synchronous Data Link Control) serial interface), to the master controller 11 which controls the carrying out of a measurement operation by the measurement system 1a. In this embodiment, the master controller 11 comprises a microprocessor 24, RAM 25 and ROM 26 (in the example shown EPROM) and is coupled to a user-operable joystick 27 that may be used, for example, for initial user positioning of the measurement probe 8 and/or for positioning of the column carriage 6 in the Z direction.

The master controller 11 is coupled to X axis drive circuitry 30, Z axis drive circuitry 31 and a Z position transducer 32.

The X axis drive circuitry 30 comprises a motor driver 33 for receiving control instructions from the microprocessor 24 for driving a motor 34 to, as discussed above, move the probe carriage 7 along the X axis datum bar (not visible in FIG. 1 or 2). The X axis drive circuitry 30 also includes an X position transducer 35 for providing X position data to the microprocessor 24 to enable the microprocessor 24 to determine the X positions at which logging of data from the Z position transducer 32 is to occur. The X position transducer 35 may also provide local feedback control to the X motor driver 33. Any suitable form of X position transducer 35 may be used, for example a diffraction grating optical interferometer may be used.

Although not shown in FIG. 2, where the metrological apparatus is capable of moving the platform 4 in the Y direction, then Y axis drive circuitry will be provided which will be controlled by the computing apparatus 10 via a serial link (SDLC) and a motion controller. Such Y axis drive circuitry will generally comprise a motor driver for receiving drive instructions from the computing apparatus 10 (via the motion controller) for driving a motor to drive the platform 4 (via a suitable form of drive mechanism, for example a ball and screw drive mechanism) in the Y direction in accordance with the control signals from the computing apparatus 10. Such Y axis drive circuitry may also include a Y position transducer for providing local feedback control to the motor driver.

The Z axis drive circuitry 31 comprises a Z motor driver 36 for receiving control instructions from the microprocessor 24 to drive a Z motor 37 to move the column carriage 6 and a Z drive transducer 38 for providing local feedback information to the Z motor driver 51.

The motors may be, for example, linear stepper motors, although any suitable form of motor may be used.

The Z position transducer 32 may be any suitable form of position transducer, for example an optical position transducer such as an interferometric position transducer or an inductive position transducer such as an LVDT (linear variable differential transducer).

Figure 3:
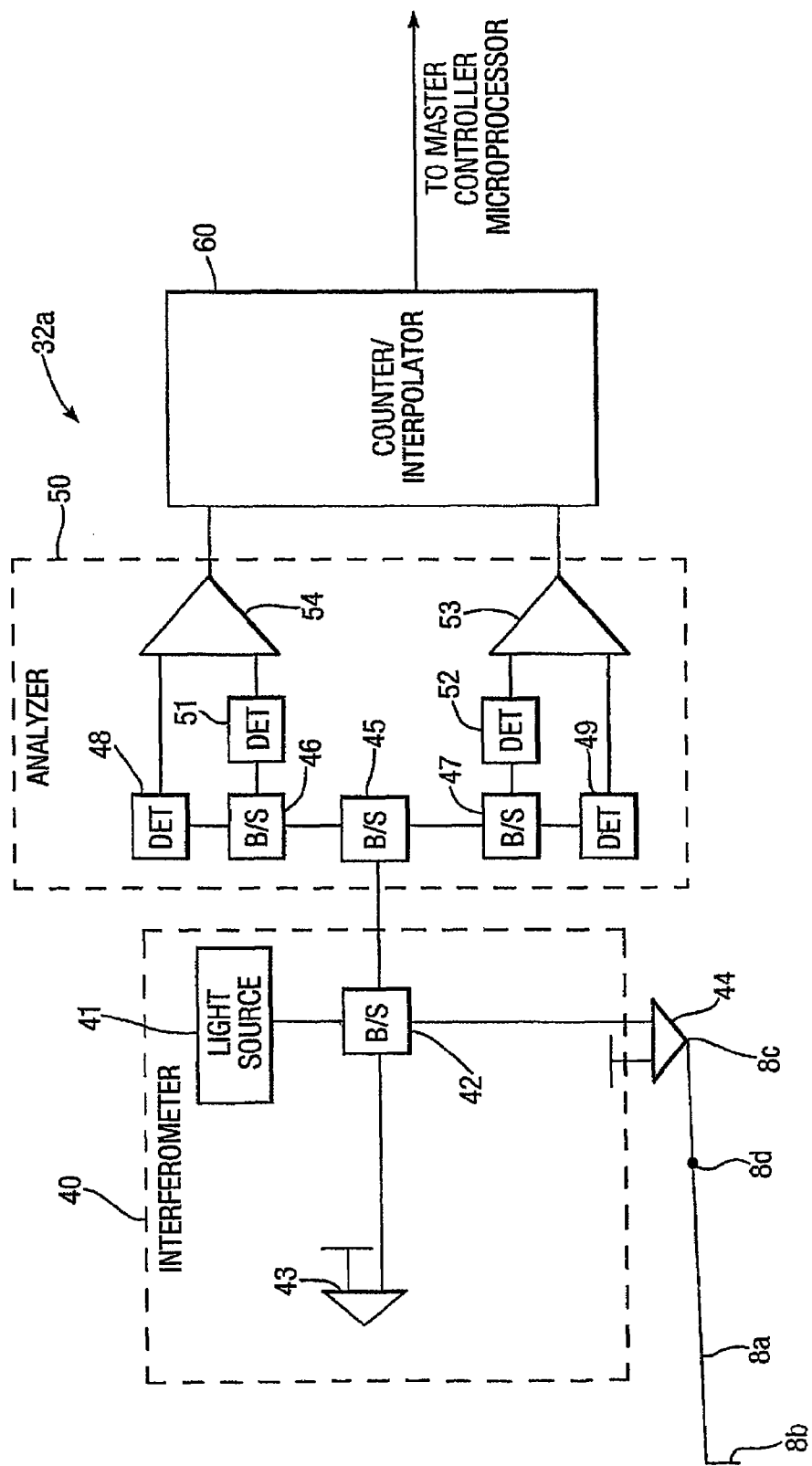
FIG. 3 shows a functional block diagram of one example of a Z position transducer for use in the metrological apparatus shown in FIG. 1.

FIG. 3 shows a functional block diagram of one example of an interferometric Z position transducer 32a which comprises an interferometer 40, an analyzer 50 and a counter/interpolator 60. The interferometer 40 and analyzer 50 may provide a polarising interferometer as described in EP-A-0036251 (the whole contents of which are hereby incorporated by reference) having a light source 41 such as a laser, a beam splitter (B/S) 42 for splitting the light from the light source into reference and measurement beams directed along corresponding reference and measurement paths, a reference corner cube or other reflector 43 mounted in the interferometer for reflecting light along the reference path back to the beam splitter 42 where it recombines and interferes with light reflected back along the measurement path by a measurement element 44 in the form of a measurement corner cube or other retro-reflector mounted to the end 8c of the stylus arm 8a remote from the stylus tip 8b.

The recombined light is supplied to the analyzer 50 which, as described in EP-A-0036251, may comprise an arrangement of beam splitters 45, 46 and 47 which split the recombined light into different polarisation components which are incident on respective ones of four photo-detectors 48, 49, 51 and 52 to provide quadrature signals. The beam splitters 42, 45, 46 and 47 may be replaced by an integral beam splitting prism as described in U.S. Pat. No. 5,517,307. The whole contents of U.S. Pat. No. 5,517,307 are hereby incorporated by reference.

As another possibility, the interferometer 40 and analyser 50 may be of the form described in U.S. Pat. No. 5,517,307 where the corner cube is replaced by a curved grating with its centre of curvature coincident with the pivot point 8a as shown, for example, in FIG. 7 of U.S. Pat. No. 5,517,307.

The quadrature signals are supplied in pairs to differential amplifiers 53 and 54 which provide inputs to a counter/interpolator 60 which operates as described in U.S. Pat. No. 5,517,307 to provide signals representing Z position data indicative of the movement of the stylus tip 8b in the Z direction as the stylus 8 follows the surface being measured. The microprocessor 24 of the master controller 11 causes these Z position data signals to be logged at equally spaced X coordinate data positions determined by X position data signals received from the X transducer 35 of the X axis drive circuitry 30 so that, when the stylus 8 has traversed a measurement path across a surface, the master controller 11 has a set of measurement data comprising pairs of X and corresponding Z coordinate data $X_k$, $Z_k$, where k is the kth measured point.

As mentioned above, other forms of optical position transducers may be used and measurement transducers other than optical interferometers may be used. Thus, for example, the measurement transducer may comprise an LVDT (linear variable differential transducer) in which the measurement element is one of a coil and a core carried by the non-stylus tip end 8c of the stylus arm 8 and in which pivotal movement of the stylus arm 8 alters the relative positions of the coil and core.

Figure 4:
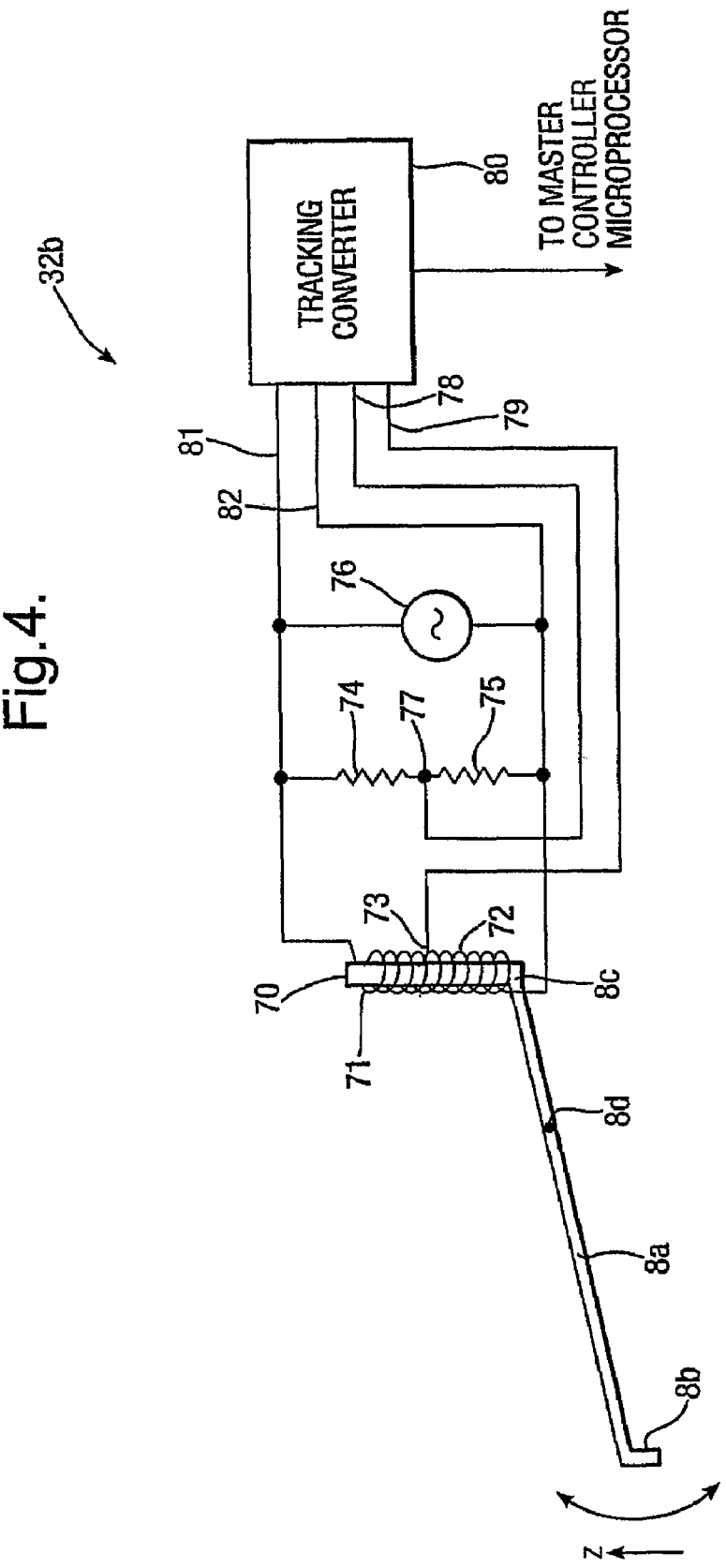
FIG. 4 shows a schematic diagram of another example of a Z position transducer for use in the metrological apparatus shown in FIG. 1.

FIG. 4 shows a functional diagram of an example of an LVDT Z position transducer 32b. This type of Z position transducer is used in the metrological apparatus described in U.S. Pat. No. 5,150,314 to which reference should be made for further details. The whole contents of U.S. Pat. No. 5,150,314 are hereby incorporated by reference.

The Z position transducer shown in FIG. 4 comprises a measurement element in the form of a magnetic core 70 which is attached to the non-stylus tip end 8c of the stylus arm 8a. Coils 71,72 magnetically coupled to the core 70 are centre-tapped at 73 and form two arms of a bridge circuit, the other two arms of which are constituted by equal resistance value resistors 74 and 75. A reference oscillator 76 supplies reference oscillations to the bridge circuit and the arrangement is such that, when the core 70 is at a centre position, the impedances of the coils 72 and 73 are equal and the voltage difference between the centre tap 73 and a further centre tap 77 between resistors 74 and 75 is zero. If the core 70 is displaced in one direction, an in-phase sinusoidal voltage appears between taps 73 and 77 having an amplitude dependent upon the distance through which the core 70 is moved. If the core is moved in the opposite direction from the centre position, an out-of-phase voltage of opposite phase appears between taps 73 and 77 with an amplitude dependent upon the distance through which the core 70 has been moved. Taps 73 and 77 are connected to provide a gauge signal to input terminals 78 and 79 of an analogue-to-digital tracking converter 80 which also receives a reference signal from the oscillator 76 on further input terminals 81 and 82. The analogue-to-digital tracking converter 80 outputs a digital signal representing the amplitude of a voltage between taps 73 and 77 for sampling by the master controller microprocessor 24 in accordance with the X coordinate data logging signals determined from the X position data provided by the X transducer 35.

The range over which the position transducers provide an output with good linearity may be smaller than the required measurement range of the metrological apparatus and a position transducer may have, at least over part of its range, a non-linear response. For example, where an LVDT transducer is used then non-linear changes in the coupling between the core and the coils may occur at the end of the measurement range while where the Z position transducer is an optical transducer of the type shown in FIG. 3, then the pivotal movement of the stylus arm may affect the measurement path length and direction. Non-linearities may also occur in the position transducer of the metrological apparatus described in U.S. Pat. No. 5,517,307, particularly at the ends of the range of the curved grating position transducer.

Also, the fact that the measurement probe in this example is a pivotally mounted stylus means that the stylus tip 8b moves along an arcuate path and is not precisely perpendicular to the plane of the surface being measured. This arcuate movement is illustrated diagrammatically in FIG. 5 in which the curved line 200 represents the surface of an object over which the stylus tip 8b is being traversed (in this example a surface of a reference sphere), the component shown referenced as 90 is the measurement element of the Z position transducer (that is the curved grating in the case of the optical Z position transducer disclosed in U.S. Pat. No. 5,517,307, the corner cube 84 in the case of the optical Z position transducer shown in FIG. 3 or one of the coil and core in the case of the inductive transducer shown in FIG. 4), the ends of the measurement path or traverse are denoted as 502 and 506, and the effective range of the position transducer in the measurement or Z direction is indicated as ZR.

Figure 5:
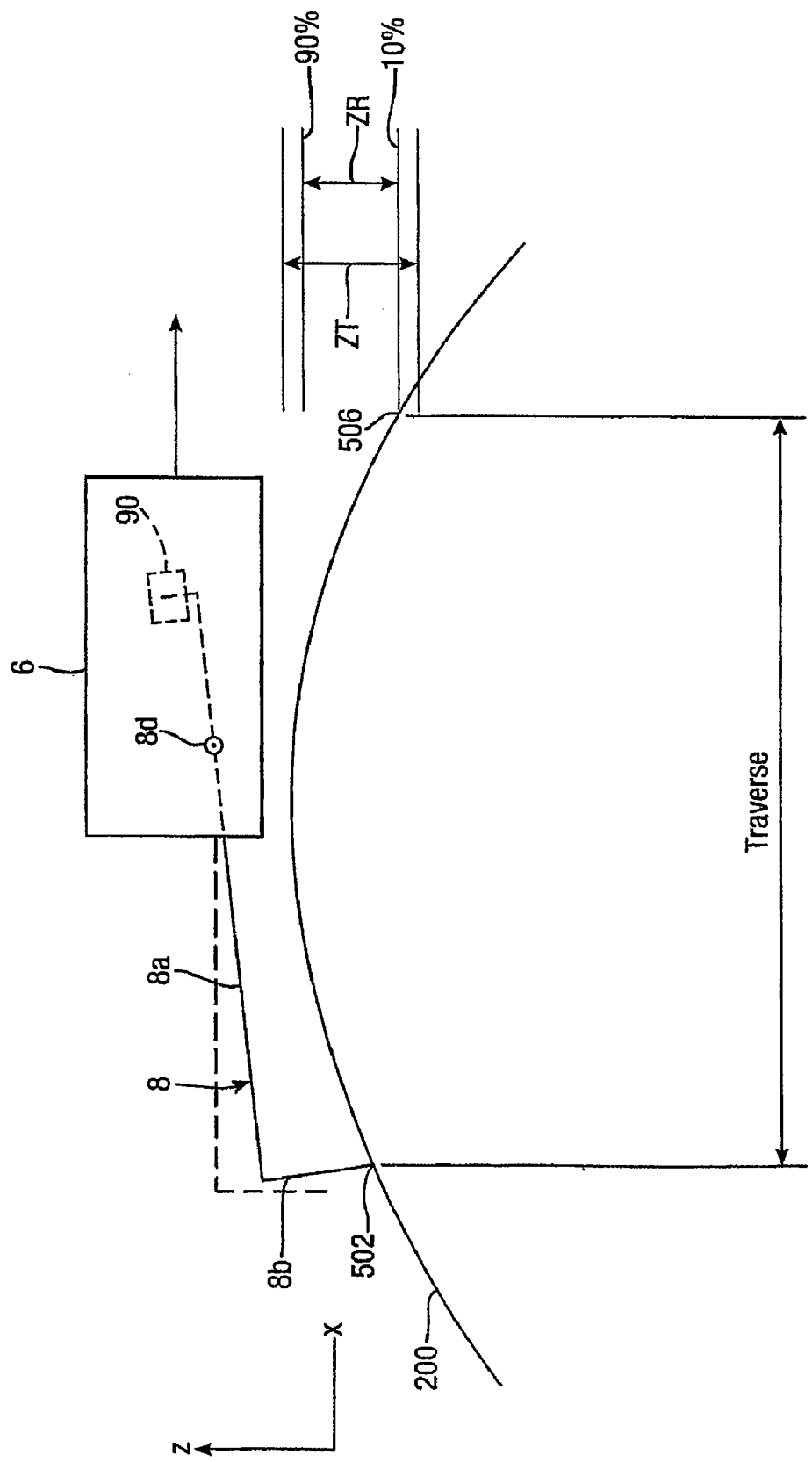
FIG. 5 shows a simplified illustration of part of the metrological apparatus shown in FIG. 1 illustrating how the stylus of the metrological apparatus moves during a measurement operation.

FIG. 5 shows two positions of the stylus arm 8a. The position shown in phantom lines is when the stylus arm 8a is effectively horizontal and the position shown in solid lines is the position when the stylus arm 8a has been pivoted so that the stylus tip 8b contacts one end 502 of the measurement range. As can be seen from FIG. 5, the arcuate movement of the stylus tip 8b as the stylus arm 8a pivots causes the X position of the stylus tip 8b to vary in accordance with the angle through which the stylus arm 8a has pivoted so that the X position changes with Z.

Further inaccuracies may arise from the finite size of the measurement probe, that is the finite size of the stylus tip 8b in the case of a stylus type measurement probe.

Transducer non-linearities, the finite size of the stylus tip 8b and the effect of pivoting of the stylus arm 8a mean that the X and Z position data obtained during a measurement operation will not necessarily accurately reflect the actual X and Z position of the stylus tip 8b.

In order to compensate for these inaccuracies, the metrological apparatus 1 is configured by processor-implementable instructions and/or data to carry out a calibration procedure which obtains calibration coefficients for correcting the X and Z position data for the effective measurement range ZR of the measurement probe.

The microprocessor 24 of the master controller 11 is programmed by means of processor-implementable instructions and/or data which will generally be provided by pre-programming the EPROM 26. Alternatively or additionally, the microprocessor 24 of the master controller 11 may be programmed by processor-implementable instructions and/or data supplied from the computing apparatus 10 via the serial data link.

Processor-implementable instructions for programming the processor 13 of the computing apparatus 10 and/or for supply to the master controller 11 to program the microprocessor 24 may be provided by being at least one of: pre-stored in the ROM 14; stored in the mass storage device 16; downloaded as signal S via the communications device 22; downloaded from a removable medium 17a; supplied by user input via the keyboard and/or pointing device, for example.

Figure 6:
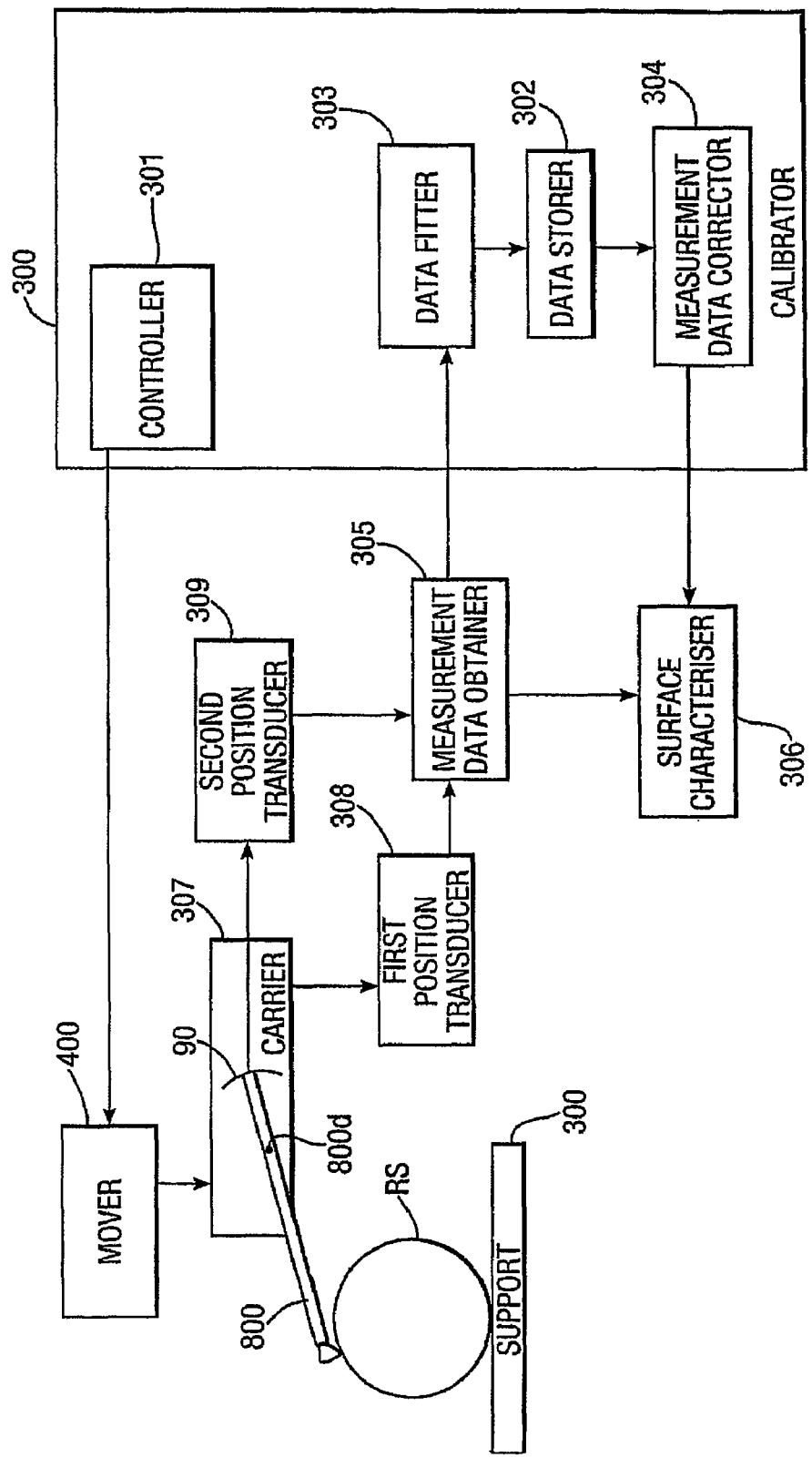
FIG. 6 shows a functional block diagram for explaining the functionality provided by a metrological apparatus configured to carry out a calibration procedure.

FIG. 6 shows a functional block diagram for explaining the functionality provided when a metrological apparatus 1, for example the metrological apparatus shown in FIGS. 1 and 2, is programmed or configured by processor-implementable instructions to carry out a calibration procedure which obtains calibration corrections or coefficients for correcting the X and Z position data.

As shown in FIG. 6, when the metrological apparatus 1 is programmed or configured by processor-implementable instructions to carry out the calibration procedure, the metrological apparatus 1 can be thought of as comprising of a number of functional units some of which may represent functionality provided by mechanical and/or electrical components of the apparatus, some of which may represent functionality provided by the programming and some of which may represent functionality provided by a combination of mechanical and/or electrical components and the programming. Therefore, the functional units illustrated in FIG. 6 do not necessarily correspond to specific hardware or software components or elements of the metrological apparatus; for example in the case of software the programming will not necessarily be such that the individual units shown in FIG. 6 can be identified within the software. Accordingly different reference numerals have been used in FIG. 6 than in FIGS. 1 to 4.

As illustrated in FIG. 6, the functional units comprise a support 300 (the workpiece support 3 and platform 4 in the example shown in FIG. 1) for receiving an object RS to be measured. A carrier 307 (the measurement probe carriage 7 in the example shown in FIG. 1) carries a measurement probe 800 (the stylus 8 in the example of FIG. 1) so that the measurement probe is movable relative to the carrier 307 and a mover 400 (the X motor driver 33 and X motor 34 in the example shown in FIG. 2) is operable to effect relative movement between the support 300 and the carrier 307 in a first direction, that is the X direction in the example shown in FIG. 1, to cause the measurement probe 800 carried by the carrier 307 to traverse a measurement path along a surface of the object RS supported by the support 300 so that the measurement probe 800 moves in a second direction, in the example shown in FIG. 1 the Z direction, transverse to the first direction as it follows surface characteristics along the measurement path.

A first position transducer 308 (the X position transducer 35 in the example shown in FIG. 1) is responsive to relative movement between the support 300 and the carrier 307 to provide first position data representing the position of the measurement probe 800 in the first direction. A second position transducer 309 (the Z position transducer 32 in the example shown in FIG. 1) is responsive to movement of the measurement probe in the second direction determined by detection of movement of the measurement element 90 carried by the measurement probe 800 to provide second position data representing the position of the measurement probe 800 in the second direction. In the example illustrated, the second position transducer 309 is of the form described in U.S. Pat. No. 5,517,307 and the measurement element 90 is a curved grating with its centre of curvature coincident with the pivot point 800$d$, although any of the Z position transducers described above may be used.

A measurement data obtainer 305 (provided in the example described above by programming of the microprocessor 24 of the master controller 11) is operable to obtain from the first and second position transducers 308 and 309 measurement data comprising the first and second position data for each of a plurality of measurement points along the measurement path while a surface characteristiser 306 (provided in the example described above by programming of the processor 13 of the computing apparatus 10) is operable to determine at least one surface characteristic of the surface using the measurement data obtained by the measurement data.

A calibrator 300 (provided in the example described above by programming of the processor 13 of the computing apparatus 10) is operable to carry out the calibration procedure.

As shown in FIG. 6, the calibrator 300 comprises a controller 301 operable to cause the measurement data obtainer 305 to obtain calibration measurement data representing the known surface form of a reference object RS by controlling the mover 400 to cause the measurement probe 800 carried by the carrier 307 to traverse a calibration measurement path on the reference object RS surface such that, during the traverse of the measurement path, the measurement probe 800 moves through at least a substantial proportion of a full measurement range ZT of the measurement probe.

The calibrator also has a data fitter 303 operable to determine calibration coefficients of at least one expression representing the relationship between corrected measurement data and the calibration measurement data by using the known form of the reference surface to determine the corrected measurement data and by varying the calibration coefficients for a number of calibration points spaced within the calibration measurement data and fewer in number than the measurement points until the at least one expression provides a fit to the data. In this example, the data fitter 303 is operable to determine calibration coefficients for respective expressions for the first and second position data. A data storer 302 is provided for storing calibration correction data. In this example, the data storer 302 stores the determined calibration coefficients so that subsequent measurement data may be corrected by applying the at least one expression using the determined calibration coefficients.

The calibrator also has a measurement data corrector 304 operable to correct measurement data obtained during a measurement operation involving a traverse over a measurement path on a surface of a workpiece whose surface characteristics (at least one of form and texture/roughness) are to be determined using the data stored by the data storer 302.

In this example, the measurement data 304 is operable to correct measurement data, as the measurement data is produced or after completion of the measurement operation, by calculating the corrected data using the at least one expression incorporating the determined calibration coefficients determined by the data fitter 303.

As another possibility, the measurement data corrector 304 may be operable to obtain correct measurement data values for at least a substantial proportion of the measurement range of the position transducer once the calibration coefficients have been determined and to store in the data storer 302 a look-up table associating each possible measurement position within the position transducer range with corresponding corrected measurement data. In this case, when a subsequent measurement operation is carried out, the measurement data corrector 304 will be operable to correct the measurement data by looking up the corresponding corrected measurement data in the look-up table.

An example of a calibration procedure carried out by the programmed metrological apparatus where the reference body RS is a reference sphere of precisely known radius will now be described with reference to FIGS. 7 to 9.

This calibration procedure consists of a first operation to obtain measurement data from a traverse over a great circle measurement path on the reference sphere RS and a second operation to determine the calibration corrections or coefficients from that measurement data.

The first operation of obtaining the measurement data over a great circle measurement path on the reference sphere RS will now be described with reference to the flow chart shown in FIG. 7.

Initially, of course, the user has to mount the reference sphere RS on the support platform 4 in normal manner and then roughly manually adjust the position of the stylus tip using the joystick 27.

The metrological apparatus 1 will generally provide the user with a graphical user interface on the display 19 to assist the user in this calibration procedure.

Figure 7:
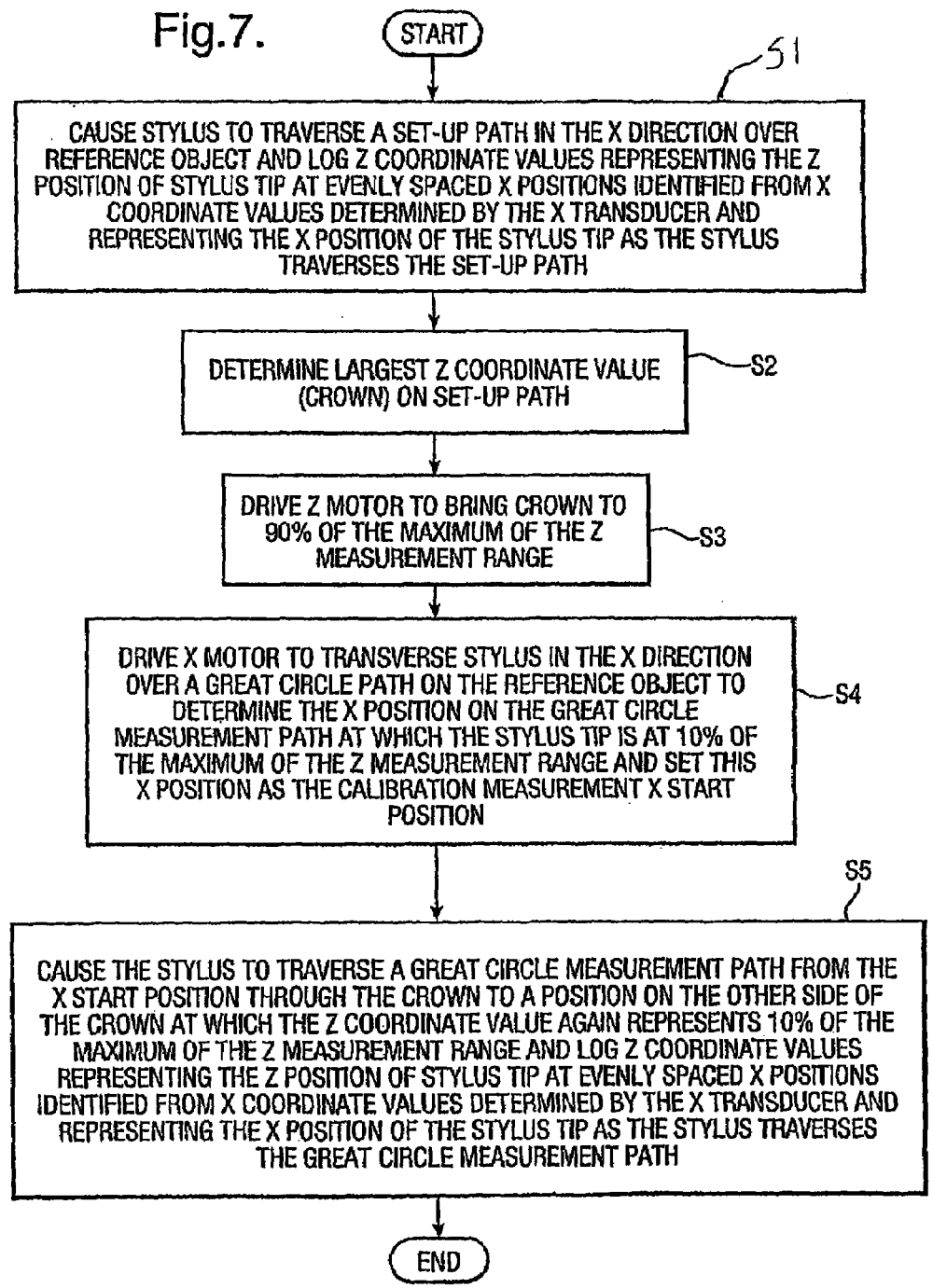
FIG. 7 shows a flowchart for illustrating one example of a method of acquiring calibration data for use in the calibration procedure.

When the user instructs the metrological apparatus via the graphical user interface (using the keyboard 20 and/or pointing device 18) to commence a calibration procedure, then, at S1 in FIG. 7, the controller 301 functionality provided by the programming of the processor 13 of the computing apparatus instructs the master controller 11 via the serial data link to cause the X motor driver 33 to drive the measurement probe carriage 7 in the X direction so that the stylus tip 8$b$ traverses a set-up path in the X direction over the reference object surface RS.

As described above, as the stylus traverses the set-up path across the reference object, the Z position transducer 32 provides Z position data which is logged by the master controller 11 at X position or coordinate logging intervals determined in accordance with X position data provided by the X transducer 35. Thus, at the end of the traverse over the set-up path, the master controller 11 will have logged Z coordinate data for a series of measurement positions evenly spaced in the X direction.

At S2, the processor 13 of the computing apparatus 10 carries out a known cresting routine (available with existing Form Talysurf series metrological apparatus including the Form Talysurf PG1 series metrological apparatus) to determine the crest or crown, that is the uppermost point, of the reference sphere.

Then, at S3, the master controller 11, under the control of the computing apparatus 10, causes the Z motor driver 36 to drive the Z motor to bring the crown of the reference sphere to a Z position which represents 90% of the maximum Z range ZT of the measurement probe.

At S4, the master controller 11, under the control of the computing apparatus 10, causes the X motor driver 33 to drive the measurement probe carriage 7 in the Z direction to cause the stylus to traverse a great circle path on the reference object RS until the Z position data or coordinate value representing the Z position of the stylus tip 8b represents 10% of the maximum Z range ZT. The X position at which the Z coordinate value represents, in this example, 10% of the full or maximum Z range ZT represents the starting point for the measurement process, that is the position 502 in FIG. 5.

Then, at S5, the master controller 11 causes the X motor driver 33 to drive the measurement probe carriage 7 to cause the stylus to traverse a great circle measurement path from the X start position 502 through the crown to a position on the other side of the crown at which the Z coordinate value again represents 10% of the full or maximum Z measurement range ZT, that is the X end position 506 shown in FIG. 5. The 10% to 90% portion of the full measurement range ZT is the effective measurement range ZR in this example, that is the measurement range over which calibration will be effected. As the stylus traverses this calibration measurement path between the X start 502 and the X end position 506, the master controller 11 logs the Z position data or coordinate values representing the Z position of the stylus tip 8b at evenly spaced X positions or measurement points identified by the master controller 11 from the X position data or coordinate values provided by the X transducer 35 to the master controller 11.

Thus, at the end of the process illustrated by FIG. 7, the master controller 11 has logged Z position data or coordinate values for a set of measurement points evenly spaced in the X direction. Typically, the Z coordinate data is logged at 0.25 micrometer intervals and the measurement path is 80 millimeters long resulting in 320000 measurement points. Although all of the obtained data may be used, typically, to provide for a faster calibration procedure, the measurement data ("the calibration measurement data") used for the calibration comprises 8000 points evenly spaced through the obtained measurement data, that is every fortieth measurement point is used for the calibration.

Once the calibration measurement data has been obtained, then the computing apparatus 10, either automatically or under user control, carries out a calibration procedure which will now be described with the help of FIGS. 8 and 9.

Figure 8:
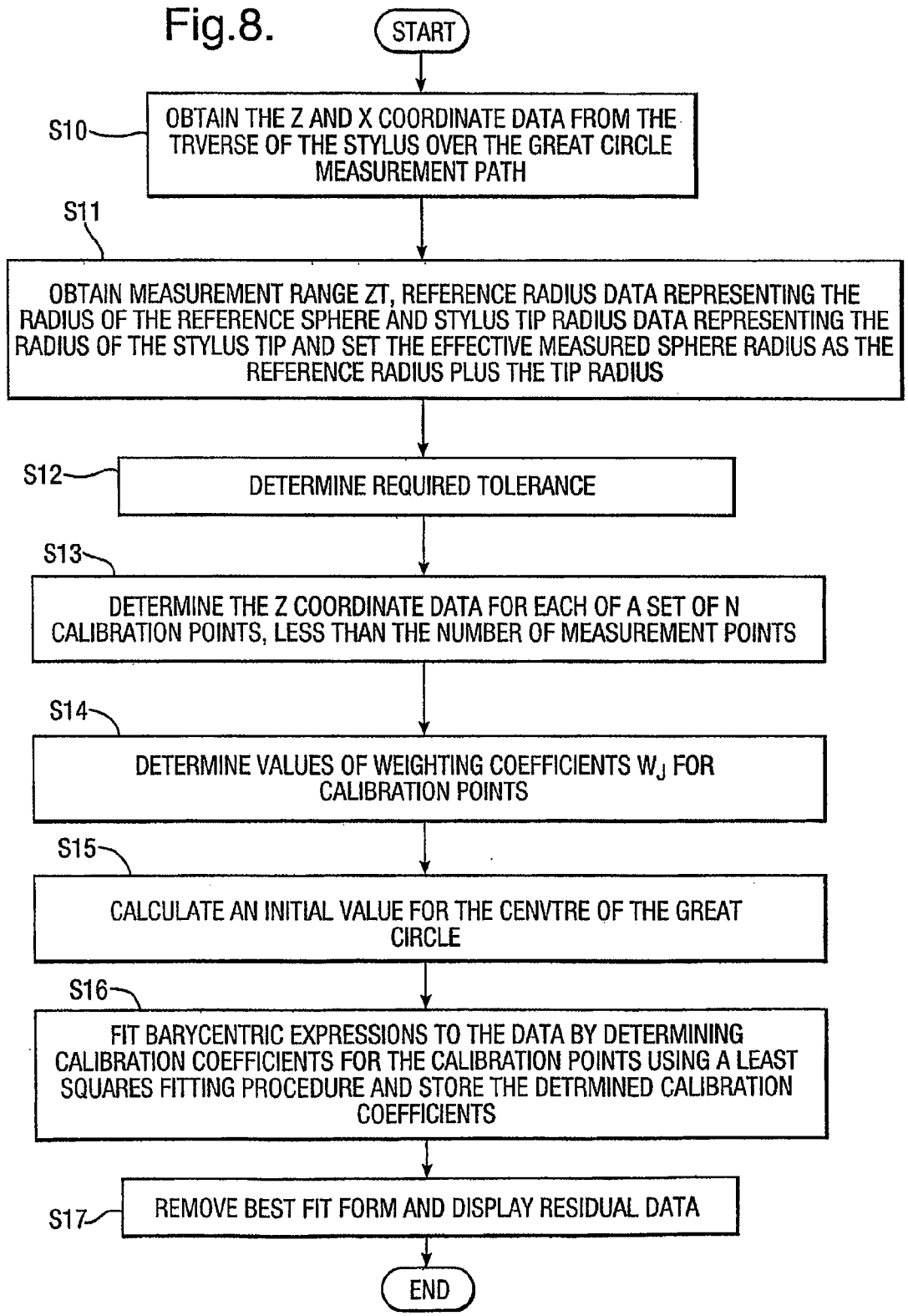
FIG. 8 shows a flowchart for illustrating an example of a calibration procedure embodying the present invention.
Figure 9:
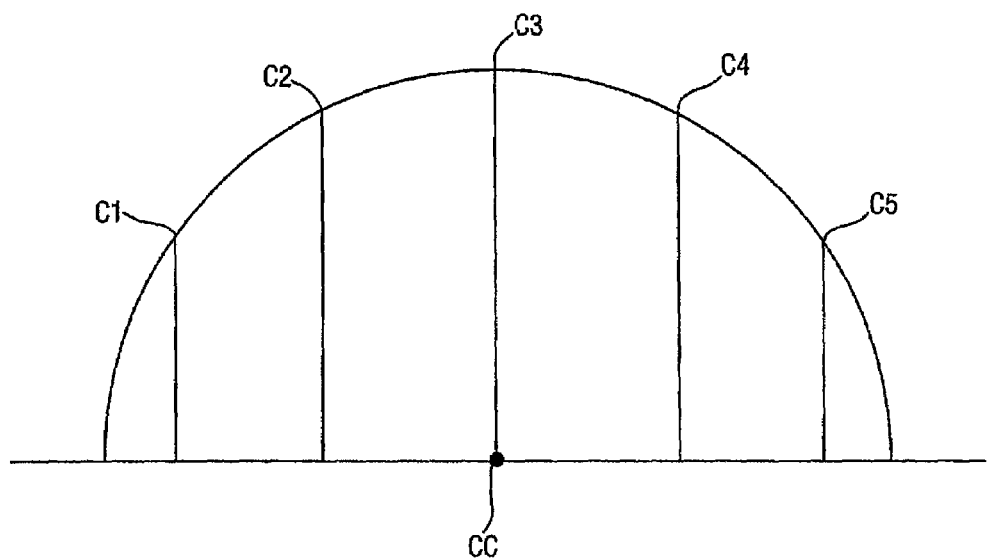
FIG. 9 shows a diagram illustrating Chebychev points on a great circle of a sphere.

Thus, when the calibration procedure is initiated (either automatically or by the user) then, at S10 in FIG. 8, the controller 301 functionality provided by programming of the processor 13 obtains the calibration measurement data from the master controller 11, that is the Z coordinate data for a set of measurement points evenly spaced in the X direction along the great circle calibration measurement path. In this example, to facilitate the subsequent calibration procedure, the measurement date are processed so that the crest of the calibration measurement path is taken to lie at X=0, Z=0.

Then, at S11, the controller 301 functionality provided by programming of the processor 13 obtains measurement range data representing the maximum or full range ZT of the measurement probe 8, reference radius data representing the radius of the reference sphere RS and stylus tip radius data representing the radius of the stylus tip 8b and sets the effective measured sphere radius as the reference radius plus the stylus tip radius.

The measurement range ZT, reference radius and the stylus tip radius data may be supplied by the user in response to a prompt displayed on the display 19 to allow for the fact that stylus tips of different radiuses may be used as may different radius reference spheres. Of course, if at least one of the measurement range ZT, the radius of the stylus tip and the reference sphere is fixed, then the corresponding data may be pre-stored by the computing apparatus 10. If both the stylus radius and the reference sphere radius are fixed, then the effective measured sphere radius can be pre-stored so that S11 obtains only the measurement range ZT and the effective measured sphere radius data.

Then, at S12, the controller 301 functionality provided by programming of the processor 13 sets the required tolerance t, that is the tolerance that determines the end point of the calibration procedure. Again, this tolerance may be supplied by the user in response to a prompt on a graphical user interface. Alternatively, the required tolerance may be pre-stored by the computing apparatus or master controller and may be determined simply by the processor 13 reading the tolerance data from memory. In this example, the tolerance is set at $1 \times 10^{-9}$ but could be smaller, for example may represent a distance of less than 0.1 nanometers.

At S13, the data fitter 303 determines the Z coordinate or position $Z_j$ for each of a set of N+1 calibration points where the number of calibration points is smaller than the number of measurement points in the calibration measurement data.

In this embodiment, the set of N+1 calibration points are Chebychev points of the second kind as described in the aforementioned paper by Berrut and Trefethen and the Z coordinate or position ZD for each of the set of calibration points is determined in accordance with $$Zj = ZT \cdot \cos(n\pi/N)$$

where n is 0, 1, ... N where ZT is the full or maximum Z measurement range of the measurement probe and is obtained, as described above, at S11 either from memory of the computing apparatus or as a result of the user being prompted by the user interface to input this data.

In an example where the Z position probe is of the type described in U.S. Pat. No. 5,517,307 used within the Form Talysurf PG1 series of metrological instruments supplied by Taylor Hobson Limited and has a measurement range of 12 millimeters (with a stylus arm length of 60 mm) N is four so that, as shown in FIG. 9, there are five calibration points, C1, C2, C3, C4 and C5 at coordinates (x1, z1), (x2, z2), (x3, z3), (x4, z4) and (x5, z5) with the centre calibration point being fixed at X=0, Z=0 and the other four calibration points C1, C2, C4 and C5 being, as Chebychev points of the second kind, at Z=ZT, $\sqrt{2}$ZT, $-\sqrt{2}$ZT and $-$ZT, where movement towards the crest of the reference sphere is taken as movement in the positive Z direction and movement away from the crest is taken as movement in the negative Z direction.

The number of calibration points may be greater than five but will always be significantly fewer than the number M of measurement points in the calibration measurement data. In general, the number of calibration points will depend upon the extent of the measurement range to be calibrated with the number of calibration points increasing with the measurement range.

At S14, the data fitter 303 functionality provided by programming the processor 13 determines a respective value of a weighting coefficient $w_j$ for each of the set of N+1 calibration points C1 to C5. As will be appreciated from the aforementioned paper by Berrut and Trefethen, the Barycentric weighting coefficients $w_j$ will be determined in accordance with the kind of Chebychev point being used. In this example, as the calibration points are Chebychev points of the second kind, the weighting coefficient $w_j$ are given by:

$$w_j = (-1)^j \delta_j$$

where $\delta_j$ is ½ for j=0 or N and is otherwise 1.

At S15, the data fitter 303 functionality provided by programming the processor 13 calculates an initial value for the centre (a,b) of the great circle measurement path in accordance with $$a = X2 + (Z3 - Z1) \cdot \frac{(Z1 + Z3 - b)}{4sp}$$

$$b = \frac{(2sp^2 + Z1^2 + Z3^2 - 2Z2^2)}{2(Z1 + Z3 - 2Z2)}$$

$$sp = \frac{(X3 - X1)}{2}$$

where Z1 is the Z measured position data or coordinate value for the first of the M measurement points, Z2 is the Z measured position data or coordinate value for the middle or centre one of the M measurement points, Z3 is the Z measured position data or coordinate value for the last of the M measurement points, X2 is the measured position data or coordinate value for the middle or centre one of the M calibration measurement points and X3 and X1 represent, respectively, the X coordinate data values for the last $X_M$ and first $X_1$ measurement points of the calibration measurement path. Typically, the number of measurement points is 80 mm/0.25 micrometers (a traverse of 80 mm with data logging at 0.25 micrometer intervals). Although all of the obtained data may be used, typically, to provide for a faster calibration procedure, 8000 measurement points evenly spaced through the obtained measurement data (that is every fortieth measurement point) are used for the calibration.

At S16, the processor 13 carries out a Barycentric calibration fitting procedure in accordance with the Barycentric Lagrange polynomial expressions:

$$Z_{cm} = \frac{\sum_{j=0}^{N} \frac{w_j}{Z_m - Z_j} BZ_j}{\sum_{j=0}^{N} \frac{w_j}{Z_m - Z_j}} \quad 1)$$

$$X_{cm} = X_m + \frac{\sum_{j=0}^{N} \frac{w_j}{Z_m - Z_j} BX_j}{\sum_{j=0}^{N} \frac{w_j}{Z_m - Z_j}} \quad 2)$$

where X and Z are the first and second directions, respectively, $Z_{cm}$ is the corrected calibrated Z data for the mth measured point where m is 1, 2, ... M, where M is the total number of measurement points, $Z_m$ is the Z coordinate of the mth measured point, $BZ_j$ is the calibration coefficient for the Z coordinate of the jth Chebychev point, $Z_j$ is the Z coordinate of the jth Chebychev point, $X_{cm}$ is the corrected calibrated X data for the mth measured point, $X_m$ is the X coordinate of the mth measured point, $BX_j$ is the calibration coefficient for the X coordinate of the jth Chebychev point, $w_j$ is the Barycentric weight for the jth Chebychev point and N+1 is the number of Chebychev points.

As mentioned above, the calibration coefficients for one of the Chebychev points are fixed. Generally, as in this example, for ease of calculation there is an odd number of Chebychev points and the calibration coefficients $BX_3$, $BZ_3$ for the middle Chebychev point C3 at X=0, Z=0 are, for ease of calculation, set to zero. Although the use of an odd number of calibration points facilitates calculation, an even number of Chebychev points may be used, in which case the Chebychev point with the fixed calibration coefficients will generally be one of two Chebychev points on either side of the middle measurement point within the measurement data. It will be appreciated that, where the calibration coefficients for a calibration point are set to zero (for example for a middle fixed point), then another option would be to set the weight for that point to zero (rather than the calibration coefficients).

Because the calibration measurement path is on a reference surface of known form, in this example a great circle, the corrected measurement data $Z_{cm}$ and $X_{cm}$ are known and the only unknowns in equations 1) and 2) are the Barycentric coefficients $BX_j$ and $BZ_j$. The data fitter 303 functionality provided by programming the processor 13 fits the Barycentric polynomial expressions to the data by optimising the calibration coefficients $BZ_j$ and $BX_j$ (apart from $BZ_3$ and $BZ_3$ which are fixed, in this example set to zero) using a least squares fitting procedure in which the calibration coefficients and the coordinates a and b of the centre of the great circle measurement path are incrementally adjusted using a least squares fitting procedure, in this case a Gauss-Newton non-linear least squares fitting procedure using Given's least squares rule, until the required tolerance is reached or the incremental adjustment has been carried out a predetermined number of times, in this example forty.

This fitting procedure minimises:

$$\sum_{i=1}^{M} \left\{ \sqrt{(X_{ci} - A)^2 + (Z_{ci} - B)^2} - R \right\}^2$$

by determining when a tolerance t (representing a distance squared) reaches a predetermined value, where $$t_i = R^2 - (X_{ci} - A)^2 - (Z_{ci} - B)^2$$

where $X_{ci}$ and $Z_{ci}$ are the current values of the corrected coordinate data for the ith measurement point, M is the total number of measurement points as above, A and B are the current values for the centre of the great circle that the calibration measurement path followed (and which were initially set at a and b above), and R is as set out above the effective radius (including the stylus tip) of the great circle calibration measurement path.

In this example, as mentioned above, the predetermined tolerance t is set at $1 \times 10^{-9}$ although a higher tolerance up to about $10^{-16}$ or a lower tolerance down to about $10^{-6}$ may be set, depending upon requirements.

At the end of this least squares fitting optimisation procedure, the calibration coefficients will have been determined, that is optimised values will have been obtained for each of four of the calibration coefficients $BX_j$ and $BZ_j$ ($BX_3$ and $BZ_3$ having being set at zero) so that, with those determined calibration coefficients, the Barycentric Lagrange polynomial expressions 1) and 2) set out above represent the best least squares fit, to within the set tolerance t, to a circle of the effective radius R of the great circle path.

The data fitter causes the determined calibration coefficients to be stored by the data storer 302.

Optionally, at S17, the data fitter 303 functionality provided by programming the processor 13 processor 13 then removes the best fit form, that is the form representing a circle of radius R, and displays the residual or error data to the operator or user as a visual check of the determined fit.

At the end of the least square optimisation procedure, the best fit forms of the polynomial equations (1 and 2) above have been determined because best fit values for the unknowns in the calibration procedure (that is the calibration coefficients $BZ_j$ and $BZ_j$, where j=1, 2, 4, and 5 in the above example) will have been determined and stored by the data storer 302.

The above-described calibration procedure thus carries out a least squares optimisation of the Barycentrically weighted Lagrange polynomial expressions shown in equations 1 and 2 by adjusting calibration coefficients for a selected sub-set (otherwise referred to as "calibration points") of the measurement points. For the same number of calibration coefficients, this procedure is much more stable than the polynomial expansion algorithm described in U.S. Pat. No. 5,150,314. This increased stability should be particularly advantageous for larger Z measurement range metrological instruments, particularly where the Z measurement range is greater than 10 mm, for example in the case of metrological apparatus such as the Form Talysurf PG1 series of metrological apparatus supplied by Taylor Hobson Limited and as described in U.S. Pat. No. 5,517,307. In contrast, the technique described in U.S. Pat. No. 5,150,314 tends to exhibit the above-mentioned Runge phenomenon for Z measurement ranges over 10 mm.

Another advantage of the described calibration procedure is that the calibration terms have a physical meaning (they are distances) so that the end point for the optimisation procedure is also meaningful, for example the end point may be when the distances all converge to a distance (tolerance) of $1 \times 10^{-9}$ m.

As set out above, data relating to the determined calibration coefficients are stored for use during a subsequent measurement operation.

A measurement operation on a surface of unknown form or texture is carried out in a manner similar to that described above with reference to FIG. 7 (where appropriate including the cresting routine to determine the highest point or centre of the workpiece whose surface characteristics are being measured before the measurement operation) so that the stylus traverses a measurement path across a surface of the workpiece and Z coordinate data are logged at evenly spaced x intervals along the measurement path.

The measurement data are corrected, either while they are being logged or after completion of the measurement operation, by the measurement data corrector 304 which, where the data storer 302 stores the determined calibration coefficients, calculates corrected Z and X coordinate data $Z_{cm}$ and $X_{cm}$ using the Barycentric Lagrange polynomial expressions 1 and 2 above with the determined values of the calibration coefficients $BZ_j$ and $BX_j$ determined by the data fitter 303 so as to present the operator with corrected measurement data. Where, as mentioned above, corrected measurement data for the range of the transducer is determined during the calibration procedure and a look-up table associating measurement data values with the corresponding correction data values is stored by the data storer 302, then the measurement data may be corrected by the measurement data corrector 304 looking up the corresponding corrected measurement data in the look-up table. This latter option may be provided as an alternative or additional option.

The measurement data corrector 304 may cause both the uncorrected and the corrected measurement data (plus possibly also the difference between the two) to be displayed to the operator or only the corrected measurement data.

The surface characteriser 306 can then process the corrected measurement data in known manner to determine surface characteristics such as Root Mean Square (RMS) roughness where roughness is being measured or a parameter indicative of the form of the surface where the form is being measured.

In the above described examples, Barycentric Lagrange interpolation is used which provides for numerical stability. However, other forms of polynomial interpolation may be used. Also, the above described calibration procedure implements a Gauss-Newton non-linear least squares fitting procedure using Givens least squares rule. Other least square fittings procedures may be used.

In the above described examples where the measurement range is 12 mm, five calibration points are used. The number of calibration points may be greater with a larger number of calibration points being used for a larger range.

In the above described examples, the calibration procedure is effected over the 10%-90% part of the full measurement range ZT of the Z position transducer. This is so as to ensure that the transducer does not go out of range before calibration. Once calibration for this effective measurement range has been completed, the calibration procedure could be repeated one or more times for an increased calibration range with the aim of calibrating as close as possible to the entire measurement range ZT of the Z position transducer.

In the above described examples, the calibration procedure is effected for first and second directions which may as described above be Z and X but could be X and Y or Z and Y. There may however be metrological apparatus for which calibration in only one of the two directions is necessary. It may also be possible to apply the present invention where the calibration procedure is to be effected for three orthogonal axes X, Y and Z, or for non-orthogonal or for non-Cartesian axes.

In the above described embodiments, the reference object used is a sphere. The reason for this is that it is not necessary for the sphere to be precisely aligned on the platform 4. The above described method may be carried out using reference bodies of other shapes provided those shapes provide scaling information. For example, a reference cylinder may be used. However, this would mean that the user would need to ensure that the longitudinal axis of the cylinder was accurately and precisely aligned with the Y axis of the metrological apparatus, or would need to perform additional computation to correct for the relative alignment of the axes. It may also be possible to use reference objects having other known forms such as trapezoidal or prismatic forms having up and down inclined surfaces or curved surfaces that provide non-circular calibration measurement paths.

In the above described embodiments, the measurement probe uses a pivotable stylus arm. The present invention may, however, be applied to a metrological apparatus having an axially movable rather than a pivotable measurement probe so that, as the measurement probe is moved along the continuous measurement path, instead of the measurement probe pivoting as it follows surface variations along the continuous measurement path, the measurement probe as a whole moves in the Z direction. The measurement probe may, for example, consist of an elongate stylus arm arranged with its longitudinal axis parallel to the said axis so that when relative movement is effected between the workpiece and the measurement probe, a stylus tip at the end of the elongate stylus arm follows variations in the surface along the continuous measurement path so that the stylus arm as a whole moves in the Z direction, that is parallel to its longitudinal axis. Where the present invention is applied to metrology metrological apparatus using axially movable measurement probes, then the arcuate error discussed above will not arise. There may however still be some error in X with Z.

Also, in the above described embodiments, the measurement probe contacts the surface. However non-contact measurement probes such as atomic force measurement probes could also be used.

In the embodiments described above, the column 5 and column carriage 6 provide for movement in the Z direction. The main reason for this is to accommodate objects of varying sizes. However, where the metrological apparatus is to be used for measuring objects of very similar dimensions in the Z direction, then the column carriage 6 may be fixed in position on the column 5. As another possibility, the column carriage may be manually moveable.

As described above, the data is logged at a specific distance interval in the x duration. As another possibility, data may be logged at a specific time interval so that the measurement points are not necessary evenly spaced in the x direction.

In the above described embodiments, the DAPCS comprises a computing apparatus and an additional master controller 11. It will, however, be appreciated that all operations of the metrological apparatus may be controlled by a single processor with appropriate interfaces to the drive and transducer circuitry or that the functionality may be distributed between more processors.

Where there is more than one processor (for example the processor of the computing apparatus 10 and the microprocessor) it is also possible that these need not be at the same physical location. For example, the serial data link 23 may be replaced by, for example, a wireless link (such as an infra red or radio frequency link or a remote wired link or a network connection). Also the user interface need not necessarily be physically coincident with the computing apparatus 10 but may be supplied by another computing apparatus remote from the computing apparatus 10 and connected thereto by a wired or wireless connection, possibly via a network.

As described above, the metrological apparatus is of a type in which changes in position in one direction as a measurement probe traverses a measurement path in a second direction are logged at intervals in the second measurement path direction. The present invention may also be applicable to instruments such as Coordinate Measurement Machines (CMM) in which a measurement probe is mounted on a first carriage so as to be movable in the Z direction, the first carriage is mounted on a second carriage be movable in the Y direction and the second carriage is mounted on a third carriage movable in the X diction so that the measurement probe is movable in three directions and in which each carriage is associated with a respective transducer and the measurement probe is moved between different X, Y, Z measurement locations along a measurement path so that, for every X, Y, Z position of the probe, respective X, Y and Z position data are provided by the transducers.

In an embodiment, a metrological apparatus has a driver 33 that effects relative movement between a support 4 and a measureme+nt probe 8 carriage 7 in a first direction X to cause the measurement probe 8 to traverse a measurement path along a surface of an object supported by the support. The measurement probe 8 moves in a second direction Z transverse to the first direction as it follows surface characteristics. Respective first and second position transducers 35, 32 provide first and second position data representing the position of the measurement probe in the first and second direction. A calibrator 300 carries out a calibration procedure using measurement data obtained on a surface of known form. The calibrator determines calibration coefficients of an expression relating corrected measurement data and the actual measurement data by using the known form of the reference surface as the corrected measurement data. The calibrator varies the calibration coefficient for Chebychev points until the at least one expression provides a fit to the data.

The invention claimed is:

1. A metrological apparatus for measuring surface characteristics of a surface of an object, the apparatus comprising:

a support for receiving an object to be measured;

a carrier for carrying a measurement probe so that the measurement probe is movable relative to the support;

a mover operable to effect relative movement between the support and the carrier in a first direction to cause the measurement probe carried by the carrier to traverse a measurement path along a surface of an object supported by the support so that the measurement probe moves in a second direction transverse to the first direction as it follows surface characteristics along the measurement path;

a first position transducer responsive to relative movement between the support and the carrier to provide first position data representing the position of the measurement probe in the first direction;

a second position transducer responsive to movement of the measurement probe in the second direction to provide second position data representing the position of the measurement probe in the second direction;

a measurement data obtainer operable to obtain from the first and second position transducers measurement data comprising the first and second position data for each of a plurality of measurement points along the measurement path;

a surface characteristic determiner operable to determine data relating to at least one surface characteristic of the surface using the measurement data obtained by the measurement data obtainer; and a calibrator operable to carry out a calibration procedure, the calibrator comprising:

a controller operable to cause the measurement data obtainer to obtain calibration measurement data representing the known surface form of a reference object by controlling the mover to cause the measurement probe carried by the carrier to traverse a calibration measurement path on the reference object surface such that, during the traverse of the measurement path, the measurement probe moves through a measurement range to be calibrated;

a data fitter operable to determine calibration coefficients of at least one expression, the calibration coefficients corresponding to physical characteristics and the at least one expression representing the relationship between corrected measurement data and the calibration measurement data by using the known form of the reference surface as the correction measurement data and by varying the calibration coefficients for a number of calibration points spaced within the calibration measurement data and fewer in number than the measurement points until the at least one expression provides a fit to the data; and a measurement data corrector operable to correct measurement data representing measurements made on a surface of a workpiece using the results of the calibration procedure.

2. Apparatus according to claim 1, wherein the measurement data corrector is operable to correct measurement data representing measurements made on a surface of a workpiece by calculating corrected measurement data using the at least one expression with the determined calibration coefficients.

3. Apparatus according to claim 1, wherein the data fitter is operable to calculate corrected measurement data for the measurement range using the at least one expression with the determined calibration coefficients and to store a look-up table associating the corrected measurement data with corresponding measurement data.

4. Apparatus according to claim 3, wherein the measurement data corrector is operable to correct measurement data representing measurements made on a surface of a workpiece using the look-up table.

5. Apparatus according to claim 1, wherein the data fitter is operable to use as the calibration points Chebychev points of the second kind determined in accordance with $Z_j = ZR \cdot \cos(j\pi/N)$ where j is 0, 1, ... N, where N+1 is the number of calibration points and ZR is the measurement range over which the calibration is effected.

6. Apparatus according to claim 1, wherein the data fitter is operable to use as the at least one expression a Barycentric expression.

7. Apparatus according to claim 1, wherein the data fitter is operable to use as the at least one expression the expression:

$$Z_c = \frac{\sum_{j=0}^{N} \frac{w_j}{Z_m - Z_j} BZ_j}{\sum_{j=0}^{N} \frac{w_j}{Z_m - Z_j}}$$

wherein Z is the second direction, $Z_c$ is the corrected Z position measured data for the mth measured point, $Z_m$ is the Z coordinate of the mth measured point, $BZ_j$ is the calibration coefficient for the Z coordinate of the jth Chebychev point, $Z_j$ is the Z coordinate of the jth Chebychev point, $w_j$ is the Barycentric weight for the jth Chebychev point, and where N+1 is the number of calibration points.

8. Apparatus according to claim 7, wherein the data fitter is operable to use as the calibration points Chebychev points of the second kind given by:

$Z_j = ZR \cdot \cos(j\pi/N)$ where j is 0, 1, ... N, where N+1 is the number of calibration points and ZR is the measurement range over which the calibration is effected.

9. Apparatus according to claim 8, wherein the Barycentric weights $w_j$ are given by:

$w_j = (-1)^j \delta_j$ where $\delta_j$ is ½ for j=0 or N, where N+1 is the number of calibration points, and is otherwise 1.

10. Apparatus according to claim 1, wherein the data fitter is operable to determine calibration coefficients for respective expressions for the first and second directions.

11. Apparatus according to claim 1, wherein the data fitter is operable to determine calibration coefficients for respective Barycentric expressions for the first and second directions:

$$Z_c = \frac{\sum_{j=0}^{N} \frac{w_j}{Z_m - Z_j} BZ_j}{\sum_{j=0}^{N} \frac{w_j}{Z_m - Z_j}}$$

$$X_c = X_m + \frac{\sum_{j=0}^{N} \frac{w_j}{Z_m - Z_j} BX_j}{\sum_{j=0}^{N} \frac{w_j}{Z_m - Z_j}}$$

where X and Z are the first and second directions, respectively, $Z_c$ is the corrected Z position measurement data for the mth measured point, $Z_m$ is the Z coordinate of the mth measured point, $BZ_j$ is the calibration coefficient for the Z coordinate of the jth Chebychev point, $Z_j$ is the Z coordinate of the jth Chebychev point, $X_c$ is the corrected X position measurement data for the mth measured point, $X_m$ is the X coordinate of the mth measured point, $BX_j$ is the calibration coefficient for the X coordinate of the jth Chebychev point, $w_j$ is the Barycentric weight for the jth Chebychev point, and where N+1 is the number of calibration points.

12. Apparatus according to claim 1, wherein the data fitter is operable to use an odd number of calibration points.

13. Apparatus according to claim 12, wherein the data fitter is operable to set the calibration coefficient(s) for the middle calibration point to zero.

14. Apparatus according to claim 1, wherein the data fitter is operable to use an odd number of calibration points and wherein the middle calibration point is fixed to coincide with a middle one of the measurement points.

15. Apparatus according to claim 1, wherein the data fitter is operable to use a least squares fitting procedure.

16. Apparatus according to claim 15, wherein the data fitter is operable to use a Gauss-Newton least squares fitting procedure.

17. Apparatus according to claim 1, wherein the reference object is a reference sphere, the calibration measurement path is a great circle path and the data fitter is operable to use a least squares fitting procedure that minimises:

$$\sum_{i=1}^{M} \left\{ \sqrt{(X_{ci} - A)^2 + (Z_{ci} - B)^2} - R \right\}^2$$

where X and Z are the first and second directions, respectively, $X_{ci}$ and $Z_{ci}$ are the current values of the corrected first and second position measurement data for the ith measurement point and A and B are the current values for the centre of the reference sphere and R is the effective radius of the great circle.

18. Apparatus according to claim 17, wherein the data fitter is operable to determine that the at least one expression provides a fit to the known form of the reference sphere when a tolerance t reaches a predetermined value, where $t = R^2 - (X_{ci} - A)^2 - (Z_{ci} - B)^2$.

19. Apparatus according to claim 17, wherein the data fitter is operable to calculate an initial value for the centre (a, b) of the great circle measurement path in accordance with $$a = X2 + (Z3 - Z1) \cdot \frac{(Z1 + Z3 - b)}{4sp}$$

$$b = \frac{(2sp^2 + Z1^2 + Z3^2 - 2Z2^2)}{2(Z1 + Z3 - 2Z2)}$$

$$sp = \frac{(X3 - X1)}{2}$$

where Z1 is the second direction position measurement data or coordinate value for the first of the measurement points, where Z2 is the second direction position measurement data or coordinate value for the middle one of the measurement points, where Z3 is the second direction position measurement data or coordinate value for the last one of the measurement points and X3 and X1 are the first direction measurement or coordinate values for the last and first measurement points, respectively.

20. Apparatus according to claim 1, wherein the calibration coefficients represent distances.

21. A metrological apparatus for measuring surface characteristics of a surface of an object, the apparatus comprising:
a support for receiving an object to be measured;
a carrier for carrying a measurement probe so that the measurement probe is movable relative to the support;
a mover operable to effect relative movement between the support and the carrier in a first direction to cause the measurement probe carried by the carrier to traverse a measurement path along a surface of an object supported by the support so that the measurement probe moves in a second direction transverse to the first direction as it follows surface characteristics along the measurement path;
a first position transducer responsive to relative movement between the support and the carrier to provide first position data representing the position of the measurement probe in the first direction;
a second position transducer responsive to movement of the measurement probe in the second direction to provide second position data representing the position of the measurement probe in the second direction;
a measurement data obtainer operable to obtain from the first and second position transducers measurement data comprising the first and second position data for each of a plurality of measurement points along the measurement path;
a surface characteristic determiner operable to determine data relating to at least one surface characteristic of the surface using the measurement data obtained by the measurement data obtainer; and
a calibrator operable to carry out a calibration procedure, the calibrator comprising:
a controller operable to cause the measurement data obtainer to obtain calibration measurement data representing the known surface form of a reference object by controlling the mover to cause the measurement probe carried by the carrier to traverse a calibration measurement path on the reference object surface such that, during the traverse of the measurement path, the measurement probe moves through a measurement range to be calibrated;
a data fitter operable to determine calibration coefficients of at least one expression representing the relationship between corrected measurement data and the calibration measurement data by using the known form of the reference surface as the correction measurement data and by varying the calibration coefficients for a number of calibration points spaced within the calibration measurement data and fewer in number than the measurement points until the at least one expression provides a fit to the data, wherein the data fitter is operable to use Chebychev points as the calibration points; and
a measurement data corrector operable to correct measurement data representing measurements made on a surface of a workpiece using the results of the calibration procedure.

22. A metrological apparatus having a controller operable to carry out a calibration procedure, wherein the controller is operable to receive measurement data comprising a set of measurement points representing different positions of a measurement probe along a measurement path on a surface of known form; and to determine calibration coefficients of an expression, the calibration coefficients corresponding to physical characteristics and the expression representing the relationship between corrected measurement data and the calibration measurement data by using the known form of the reference surface as the correction measurement data and by varying the calibration coefficients for a number of calibration points spaced within the calibration measurement data and fewer in number than the measurement points until the at least one expression provides a fit to the data, thereby enabling corrected measurement data to be obtained using the determined calibration coefficients in the at least one expression.

23. A method of calibrating a metrological apparatus having a support for receiving an object to be measured, a carrier for carrying a measurement probe so that the measurement probe is movable relative to the measurement probe support, a mover operable to effect relative movement between the support and the carrier in a first direction to cause the measurement probe carried by the carrier to traverse a measurement path along a surface of an object supported by the support so that the measurement probe moves in a second direction transverse to the first direction as it follows surface characteristics along the measurement path, a first position transducer responsive to relative movement between the support and the carrier to provide first position data representing the position of the measurement probe in the first direction and a second position transducer responsive to movement of the measurement probe in the second direction to provide second position data representing the position of the measurement probe in the second direction,
the method comprising the steps of:
obtaining calibration measurement data representing the known surface form of a reference object by controlling the mover to cause the measurement probe carried by the carrier to traverse a calibration measurement path on the reference object surface such that, during the traverse of the measurement path, the measurement probe moves through a measurement range to be calibrated;
determining calibration coefficients of at least one expression, the calibration coefficients corresponding to physical characteristics and the at least one expression representing the relationship between corrected measurement data and the calibration measurement data by using the known form of the reference surface as the correction measurement data and by varying the calibration coefficients for a number of calibration points spaced within the calibration measurement data and fewer in number than the measurement points until the at least one expression provides a fit to the data to provide calibration coefficients for enabling measurement data representing measurements made on a surface of a workpiece to be corrected.

24. A calibrator for use in a metrological apparatus for measuring surface characteristics of a surface of an object, the calibrator comprising:

a controller operable to obtain calibration measurement data representing the known surface form of a reference object by controlling a mover to cause a measurement probe to traverse a calibration measurement path on the reference object surface such that, during the traverse of the measurement path, the measurement probe moves through at least a measurement range to be calibrated of the measurement probe;

a data fitter operable to determine calibration coefficients of at least one expression, the calibration coefficients corresponding to physical characteristics and the at least one expression representing the relationship between corrected measurement data and the calibration measurement data using the known form of the reference surface as the corrected measurement data and by varying the calibration coefficients for a number of calibration points spaced within the calibration measurement data and fewer in number than the measurement points until the at least one expression provides a fit to the data; and a measurement data corrector operable to correct measurement data representing measurements made on a surface of a workpiece using the results of the calibration procedure.

25. A computer program product comprising processor implementable instructions on a computer readable storage medium for programming a processor to carry out a method of calibrating a metrological apparatus having a support for receiving an object to be measured, a carrier for carrying a measurement probe so that the measurement probe is movable relative to the support, a mover operable to effect relative movement between the support and the carrier in a first direction to cause the measurement probe carried by the carrier to traverse a measurement path along a surface of an object supported by the support so that the measurement probe moves in a second direction transverse to the first direction as it follows surface characteristics along the measurement path, a first position transducer responsive to relative movement between the support and the carrier to provide first position data representing the position of the measurement probe in the first direction and a second position transducer responsive to movement of the measurement probe in the second direction to provide second position data representing the position of the measurement probe in the second direction, the method comprising the steps of:

obtaining calibration measurement data representing the known surface form of a reference object by controlling the mover to cause the measurement probe carried by the carrier to traverse a calibration measurement path on the reference object surface such that, during the traverse of the measurement path, the measurement probe moves through a measurement range to be calibrated;

determining calibration coefficients of at least one expression, the calibration coefficients corresponding to physical characteristics and the at least one expression representing the relationship between corrected measurement data and the calibration measurement data by using the known form of the reference surface as the correction measurement data and by varying the calibration coefficients for a number of calibration points spaced within the calibration measurement data and fewer in number than the measurement points until the at least one expression provides a fit to the data to provide calibration coefficients for enabling measurement data representing measurements made on a surface of a workpiece to be corrected.

* * * * *